US 6,609,035 B1

(12) United States Patent
Liska

(10) Patent No.: US 6,609,035 B1
(45) Date of Patent: Aug. 19, 2003

(54) ADAPTIVE MOTION CONTROLLER

(75) Inventor: Timothy J. Liska, W. Simsbury, CT (US)

(73) Assignee: Emhart Glass S.A., Cham (CH)

( * ) Notice: Subject to any disclaimer, the term of this patent is extended or adjusted under 35 U.S.C. 154(b) by 0 days.

(21) Appl. No.: 09/558,020

(22) Filed: Apr. 25, 2000

(51) Int. Cl.$^7$ ............................................. G05B 13/02
(52) U.S. Cl. ........................... 700/28; 700/37; 318/51; 318/561
(58) Field of Search ............................. 700/28, 56, 61, 700/37, 170, 173; 318/561, 51, 625

(56) References Cited

U.S. PATENT DOCUMENTS 5,657,087 A * 8/1997 Jeong et al. ................. 348/416
5,798,626 A * 8/1998 Liska et al. ................. 318/562
6,052,252 A * 4/2000 Kim ......................... 360/78.09
6,473,657 B1 * 10/2002 Moriarty ....................... 700/28

* cited by examiner

Primary Examiner—Paul P. Gordon
(74) Attorney, Agent, or Firm—Spencer T. Smith

(57) ABSTRACT

An adaptive motion controller for driving a servo motor. The adaptive motion controller includes a computer control module which stores information for configuring an amplifier to a specific servo motor. The amplifier has a chip which will configure the amplifier for a specific servo motor upon receiving the stored information. A computer control module receives the stored information and delivers it to the chip.

6 Claims, 2 Drawing Sheets

ADAPTIVE MOTION CONTROLLER

The present invention relates to motion controllers for driving a variety of servo motors.

BACKGROUND OF THE INVENTION

Motion controllers conventionally have an amplifier which is selected for its match to the servo motor. As a result different servo motors require amplifiers that are configured differently and this means that any inventory of amplifiers for a number of servo motors will require a corresponding set of motion controllers.

OBJECT OF THE INVENTION

It is an object of the present invention to provide a motion controller which can be configured to drive a variety of servo motors.

BRIEF DESCRIPTION OF THE PREFERRED EMBODIMENT

Figure 1:
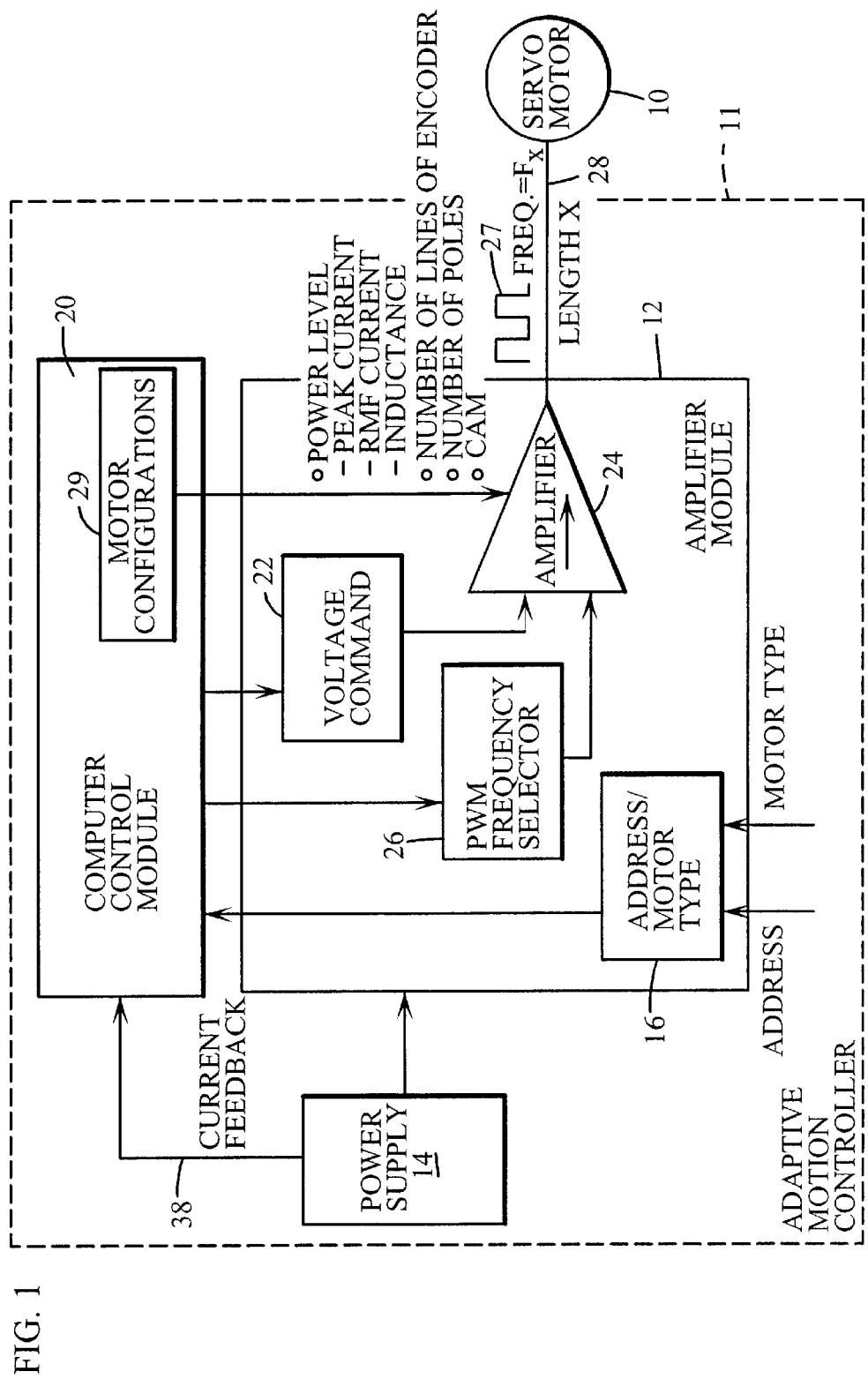
FIG. 1 is a schematic drawing of an adaptive motion controller made in accordance with the teachings of the present invention.

As illustrated in FIG. 1, a servo motor 10 is to be driven by an adaptive motion controller 11 which includes an amplifier module 12 powered by a power supply 14. The amplifier module includes a location 16 for receiving, storing and outputting address and motor type data which can be inputted in any suitable manner such as by locating a multi-position switch at a location representing the location of the amplifier module and by locating a multi-position switch at a location representing the motor type (both not shown).

The adaptive motion controller also includes a computer control module (CCM) 20 which will receive the stored information and deliver properly addressed data to the amplifier module. Specifically, the CCM, knowing the motor type will supply the amplifier with information for configuring the amplifier including the power level (peak current, the RMF (root mean square) current, and the inductance), the number of lines in the encoder, the number of poles and the cam or profile for the desired displacement. The CCM stores a number of Motor Configurations 29, one for each motor to be driven, and downloads the correct data to the amplifier module. The CCM also sends a signal to the PWM (pulse width modulation) Frequency Selector 26 to set the desired frequency to the amplifier.

The amplifier module, when built, is accordingly not configured for any servo motor, but, when dedicated by setting the address and motor type, and connected to the CCM will be automatically configured for that motor. The amplifier could, for example, be configured to drive a ½, 1, 2, 5, or 10 horsepower motor.

Figure 2:
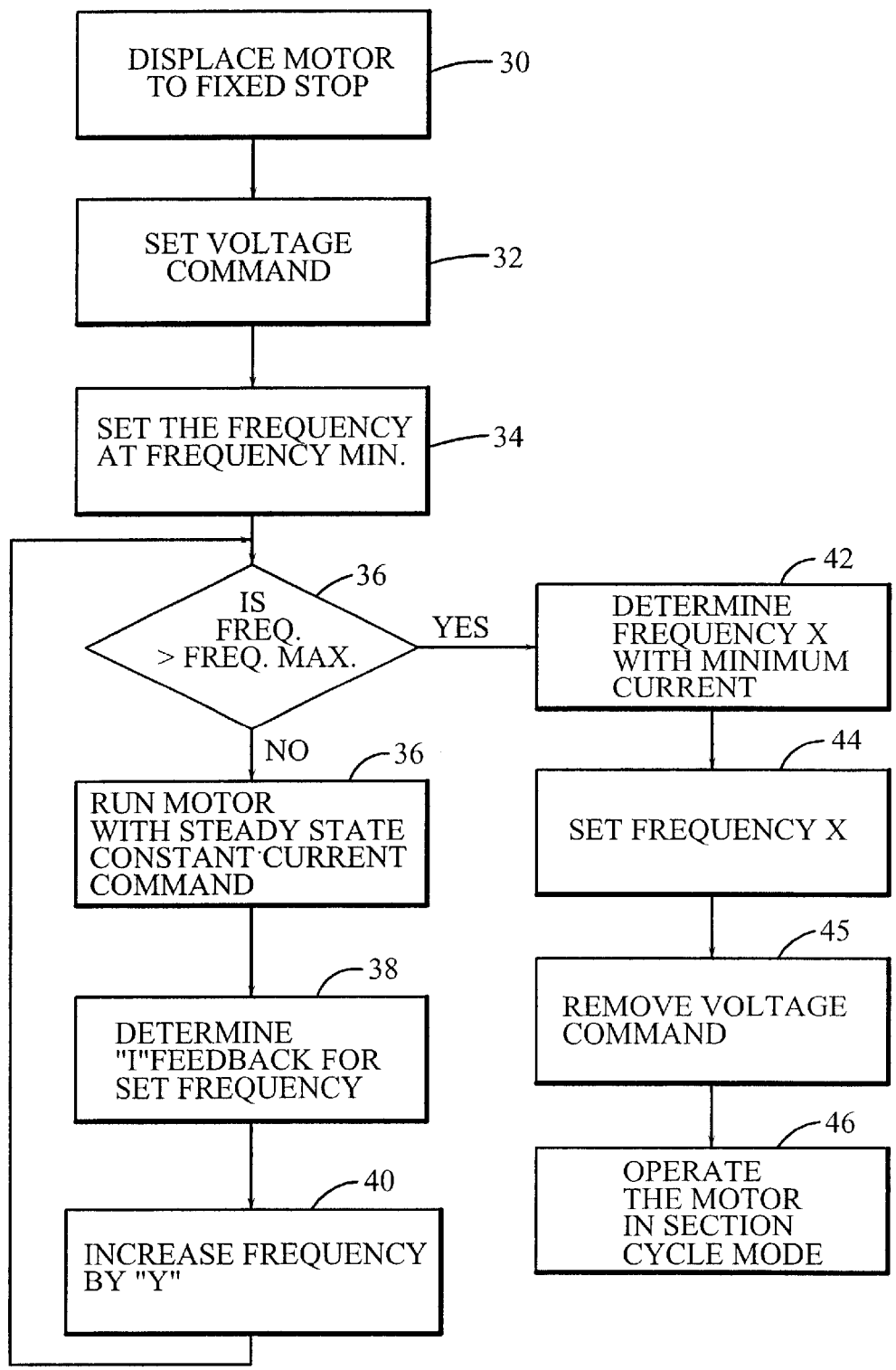
FIG. 2 is a control drawing illustrating the operation of a portion of the motion controller.

The output of the amplifier is a pulse width modulated wavelength frequency 27 (Fx) which is a function, in part, of the length X of the cables 28 connecting the amplifier to the servo motor and this frequency is selectively set. Referring to FIG. 2, the CCM operates the amplifier to run the motor the Mechanism that it is displacing) until it is located at a fixed stop (Displace Motor To Fixed Stop 30). The CCM is then operated in a test mode to Set Voltage Command 32 in the Voltage Command 22 and to Set The Frequency At Frequency Minimum 34 in the PWM Frequency Selector 26 of the amplifier. If the frequency that is seen by the Is Frequency>Frequency Maximum 36 decision location, the CCM will Run Motor With Steady State Constant Current Command 36. The CCM will Determine the Current Feedback 38 from the Power Supply, then Increase Frequency By "Y" 40 and return to the decision block 36 where the process will be repeated until the set frequency is greater than the maximum frequency, whereupon the CCM will Determine Frequency X With Minimum Current 42 and finally Set Frequency X 44 in the Frequency Selector 26. The control will then Remove Voltage Command 45. While FIG. 2 illustrates one method by which current usage across the possible frequency range is determined, other approaches are well known. With the motor configured and with the frequency selected the CCM will then Operate The Motor In Section Cycle Mode 46.

What is claimed is:

1. An adaptive motion controller for driving a servo motor which can be one of a plurality of motor types, the servo motor having a power level, comprising
    an amplifier module including
        an amplifier having an address,
        means for storing information including the address of the amplifier module and the one of a plurality of motor types to be driven by the amplifier, and
    a computer control module
        for storing configuration data for a plurality of motor types,
        for receiving the information stored in the amplifier module including the address of the amplifier module and including information specific to the one of the plurality of types of motors to be driven, and
        for supplying configuration information for the one type of motor to be driven by said amplifier.

2. An adaptive motion controller for driving a servo motor according to claim 1, wherein the stored information includes the power level of the servo motor.

3. An adaptive motion controller for driving a servo motor according to claim 2, wherein the stored power level information level information includes peak current, RMF current and inductance.

4. An adaptive motion controller for driving a servo motor according to claim 1, wherein the servo motor includes an encoder and the stored information includes the number of lines in the encoder.

5. An adaptive motion controller for driving a servo motor according to claim 1, wherein the stored information includes the number of poles in the motor.

6. An adaptive motion controller for driving a servo motor according to claim 1, wherein the stored information includes a cam or profile for controlling the displacement of the servo motor.

* * * * *